Dec. 19, 1950  W. A. BARNES  2,534,396
FASTENING DEVICE COMPRISING HOOK AND EYE ELEMENTS
Filed June 24, 1949

*INVENTOR.*
WALLACE A. BARNES
BY
Hoodling and Krost
attys.

Patented Dec. 19, 1950

2,534,396

UNITED STATES PATENT OFFICE 2,534,396

FASTENING DEVICE COMPRISING HOOK-AND-EYE ELEMENTS

Wallace A. Barnes, Cleveland, Ohio, assignor to The Langenau Manufacturing Company, a corporation of Ohio Application June 24, 1949, Serial No. 101,207

1 Claim. (Cl. 292—113)

This invention relates to an improvement in fastening devices and more particularly to fastening device wherein a hook element engages an eye element.

Although not limited thereto, the present invention is frequently used to fasten the drop walls of a casket and will be so illustrated in the patent drawings.

An object of this invention is the provision of a fastening device which may be easily latched and unlatched.

Another object of the invention is the provision of guiding the hook into the catch or eyelet.

Another object of the invention is the provision of an actuating lever and a hook which move toward each other but on opposite sides of the eyelet during the latching operation.

Another object of the invention is the provision in a fastening device whereby the actuating lever covers the hook element in the latched position.

Still another object of the invention is the provision of a fastening device wherein the members which are secured together by the fastening device are constrained against movement in all directions by the interlocking fitting engagement effected by the latching device.

Other objects and a fuller understanding of the invention may be had by referring to the following description and claim, taken in conjunction with the accompanying drawings, in which:

Figure 1:
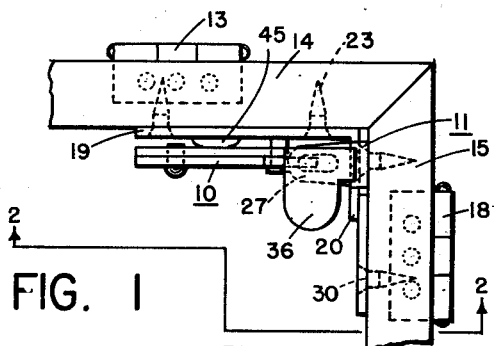
Figure 1 is a fragmentary plan view showing the latching device securing the corner of a drop front member and a drop end member of a casket together, the latching device being illustrated in its closed position.
Figure 2:
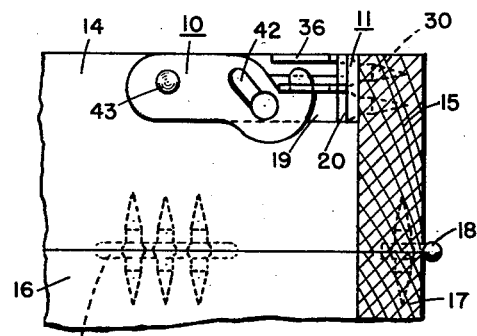
Figure 2 is a side elevational view showing the latching device, the section being taken along line 2—2 of Figure 1, the fastening device being shown in its latched position.
Figure 3:
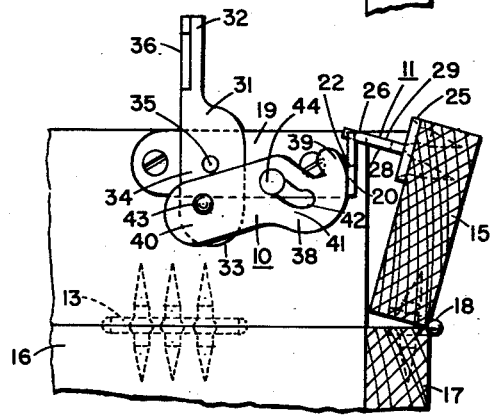
Figure 3 is a view similar to Figure 2 with the drop end member almost closed, showing the fastening device in the unlatched position in readiness to be latched when the drop end member is closed.

In its preferred embodiment, the fastening device comprises generally two parts; namely, an engaging part illustrated by the reference character 10 and an engageable part illustrated by the reference character 11. The engaging part 10 is mounted on the inside of the drop front member 14 of the casket and the engageable part 11 is mounted on the inside of the drop end member 15 of the casket. The fastening device is adapted to join the corner of the drop front member 14 and the drop end member 15. The drop front member 14 may be hingedly connected by a hinge 13 to the front of the casket which is illustrated by the reference character 16. Similarly, the drop end member 15 may be suitably connected by a hinge 18 to the end of the casket which is illustrated by the reference character 17.

The engaging part 10 of the fastening device comprises a main mounting plate 19, an actuator 31, and a latch member 38. The main mounting plate 19 has a flange 20 extending laterally therefrom. The flange 20 has walls defining a recess 21, the bottom wall of the recess being illustrated by the reference character 22. The mounting plate 19 may be fastened to the drop front member 14 by any suitable means, such for example as by screws 23.

The engageable part 11 of the fastening device comprises an engageable mounting plate 25 which may be suitably fastened to the drop end member 15 by means of screws 30. Extending laterally from the engageable mounting plate 25 and integrally formed therewith is a tongue 26 having walls defining a catch or opening 27. The tongue 26 is adapted to fit into the recess 21 and the bottom side of the tongue, which is illustrated by the reference character 28, is arranged to fit next adjacent to the bottom 22 of the recess.

The actuator 31 has an intermediate portion 34 pivotally connected to the main mounting plate 19 by means of a pivot pin 35 which is anchored to a bulge 45 so that the actuator is spaced from the mounting plate. The upper end of the actuator comprises a manually operable lever 32 and the lower end of the actuator comprises a swinging arm 33 to which the left hand end 40 of the latch member 38 is pivotally connected by means of a pivot pin 43. The right hand end of the latch member 38 is provided with a hook 39 which is adapted to engage the catch or opening 27 of the tongue 26 when the manually operable lever 32 is depressed. The intermediate portion 41 of the latch member 38 is provided with a slot 42 which slidably receives a guide post 44 that is anchored to the main mounting plate 19. The right-hand terminating end of the upper longitudinal side of the latch member 38 forms the inside of the hook 39. The guide slot 42 is located between the hook 39 and the pivot pin 43 and extends diagonally of the latch member at an angle to the upper longitudinally extending side. As shown in the drawings, the upper end of the slot is closer to the pivot pin 43 and to the upper longitudinally extending side of the latch member than the lower end of the slot.

In operation of the fastening device the drop front member 14 and the drop end member 15 are lifted into position and then it is only necessary for the operator to depress the manually operable lever 32, the latching action being entirely automatic. Upon depressing the manually operable lever 32 from a raised position to its latched or lowered position, the hook 39 is caused to enter the opening or catch 27 from the underneath side of the tongue 26. Accordingly, the manually operable lever 32 and the hook 39 move toward each other but on opposite sides of the tongue during latching movement of the actuator. As illustrated, the manually operable lever 32 is provided with an operating tab 36 which extends over the hook 39 and the top side 29 of the tongue 26. This operating tab 36 completely covers and guards the hook and the eyelet when the fastening device is in its latched position.

Figure 4:
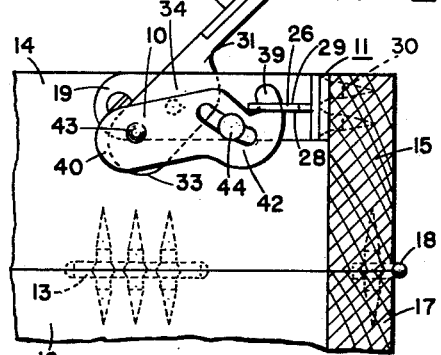
Figure 4 is a view similar to Figure 3 with the hook of the fastening device engaged but the manually operated lever partly closed.
Figure 5:
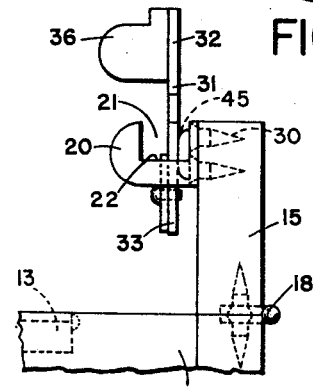
Figure 5 is an end view of the fastening device looking from left to right in Figure 1 with the drop end member in its lower position to give a clear view of the end of the fastening device.
Figure 6:
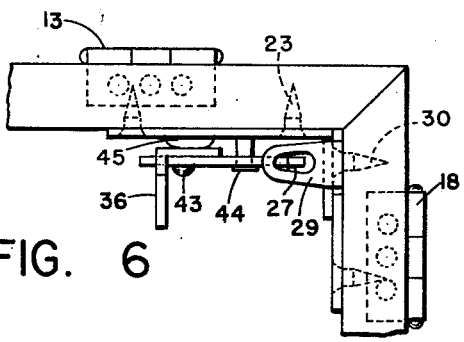
Figure 6 is a view similar to Figure 1 but with the fastening device shown in the unlatched position.
Figure 7:
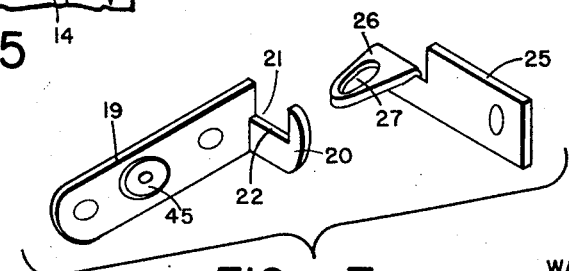
Figure 7 is a perspective view of both the mounting plates of the fastening device.

In the latched position of the fastening device, the drop front member 14 and the drop end member 15 are securely joined together and are constrained against movement in all directions. It is to be further observed that during the latching operation there is no need for the operator to manually guide the hook into the catch because in the present invention the operation is entirely automatic. The hook securely holds the tongue within the recess and there it is constrained against movement by the walls of the recess. During the latching operation, the swinging arm 33 of the actuator 31 draws the hook to the left as shown in Figure 4 and thereby pulls the drop end member 15 tightly against the drop front member 14 to provide a firm engagement therebetween. Upon unlatching the fastening device, it is only necessary for the operator to lift the manually operated lever 32 and during this unlatching movement the hook 39 is guided out of the opening or catch 27 by the cooperation of the guide slot 42 and the guide post 44. It will be observed that the angularity of the guide slot 42 is substantially the same as the sweep taken by the pivot pin 43 with the result that the guide slot 42 and the post 44 cooperate with the pivot pin 43 for directing the hook 39 in the catch or opening 27 of the tongue 26. It will be observed that the lower end of the guide slot 42 is at a slightly smaller angle with respect to the horizontal than the upper part of the guide slot with the result that the movement of the hook 39 during the latter stages of the latching movement is predominantly horizontal in order to draw the tongue 26 well into the recess 21 of the flange 20, and in the latched position the pivot pin 43 is slightly over center so that a strong pull on the hook will not unlatch the hook.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

In a latching mechanism adapted for engagement with an engageable mounting plate provided with an engageable tongue extending laterally therefrom, said tongue having walls defining a catch and also having first and second opposite sides, said latching mechanism comprising a latch mounting plate having a flange extending laterally therefrom, said flange having walls including a bottom defining a recess for receiving said tongue with the first side of the tongue fitting adjacent the bottom of the recess, an actuator having first and second end portions with an intermediate portion therebetween, pivot means for pivotally mounting said intermediate portion to said latch mounting plate, said first end portion of the actuator constituting a manually operable lever and being swingable in a path on the side of the pivot means which is adjacent to said flange, said second end portion of the actuator constituting a swinging arm and being swingable in a path on the side of the pivot means which is opposite from said flange, a latch member having first and second end portions with a longitudinally extending side having a recess therein forming the inside of a hook at said first end portion for engaging said catch to hold said tongue in said recess, a pivot pin for pivotally connecting said second end portion of the latch member to said swinging arm to draw said hook into said catch, said latch member having a guide slot between said hook and said pivot pin and extending diagonally of said latch member at an angle to said longitudinally extending side, said guide slot having first and second ends with said first end of the slot located closer to said pivot pin and to said longitudinally extending side than said second end of said slot, a guide post mounted on said latch mounting plate intermediate said flange and said pivot means and extending laterally therefrom and slidably fitting in said guide slot, said guide slot and said post directing said hook into said catch upon movement of said manually operable lever, movement of said manually operable lever toward the inside of the hook and the second side of the tongue causing the hook to move toward the lever and enter the catch from the first side thereof, said manually operable lever fitting between the latch mounting plate and the latch member in the latched position of the hook and having a laterally extending tab lying adjacent the second side of the tongue and covering the hook, said tab extending laterally beyond the hook and tongue and presenting a manually engageable portion for actuating said lever free from interference with said hook and tongue.

WALLACE A. BARNES.

REFERENCES CITED

The following references are of record in the file of this patent:

UNITED STATES PATENTS

| Number | Name | Date |
|---|---|---|
| 1,531,090 | Gilbert | Mar. 24, 1925 |
| 1,831,588 | Clark | Nov. 10, 1931 |

FOREIGN PATENTS

| Number | Country | Date |
|---|---|---|
| 95,989 | Sweden | June 13, 1939 |